US011578889B2

United States Patent
Sato

(10) Patent No.: US 11,578,889 B2
(45) Date of Patent: Feb. 14, 2023

(54) INFORMATION PROCESSING APPARATUS AND AIR-CONDITIONING SYSTEM PROVIDED WITH THE SAME

(71) Applicant: Mitsubishi Electric Corporation, Tokyo (JP)

(72) Inventor: Yasushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/265,239

(22) PCT Filed: Oct. 2, 2018

(86) PCT No.: PCT/JP2018/036850
§ 371 (c)(1),
(2) Date: Feb. 2, 2021

(87) PCT Pub. No.: WO2020/070794
PCT Pub. Date: Apr. 9, 2020

(65) Prior Publication Data
US 2021/0302044 A1    Sep. 30, 2021

(51) Int. Cl.
*F24F 11/46* (2018.01)
*F24F 11/63* (2018.01)
(Continued)

(52) U.S. Cl.
CPC ............ *F24F 11/46* (2018.01); *F24F 11/58* (2018.01); *F24F 11/61* (2018.01); *F24F 11/63* (2018.01);
(Continued)

(58) Field of Classification Search
CPC .. F24F 11/46; F24F 11/58; F24F 11/61; F24F 11/63; F24F 11/64; F24F 2110/10;
(Continued)

(56) References Cited

U.S. PATENT DOCUMENTS

2015/0308708 A1\* 10/2015 Harada ................... G06Q 50/06
700/276
2016/0054018 A1\* 2/2016 Motodani ................ F24F 11/62
700/276
(Continued)

FOREIGN PATENT DOCUMENTS

JP    H11-094327 A    4/1999
JP    2011-214794 A    10/2011
(Continued)

OTHER PUBLICATIONS

Office Action dated Nov. 9, 2021, issued in corresponding JP Patent Application No. 2020-550980 (and English Machine Translation).
(Continued)

*Primary Examiner* — Kenneth M Lo
*Assistant Examiner* — Istiaque Ahmed
(74) *Attorney, Agent, or Firm* — Posz Law Group, PLC

(57) ABSTRACT

An information processing apparatus incudes a schedule determination unit configured to determine a schedule of an operating status for causing a temperature of an air-conditioned space of each of a plurality of load-side units to reach a specified set temperature at a specified set time, based on a learning model representing an input-output relationship between input data indicating an influencing factor of a thermal load of each of the load-side units and output data indicating the thermal load.

11 Claims, 7 Drawing Sheets

(51) Int. Cl.
*F24F 11/64* (2018.01)
*F24F 11/58* (2018.01)
*F24F 11/61* (2018.01)
*G05B 13/02* (2006.01)

(52) U.S. Cl.
CPC .......... *F24F 11/64* (2018.01); *G05B 13/0265* (2013.01)

(58) Field of Classification Search
CPC ... F24F 2110/12; F24F 11/80; G05B 13/0265; G05B 2219/2614; G05B 15/02; G06N 20/00
See application file for complete search history.

(56) References Cited

U.S. PATENT DOCUMENTS

2016/0330285 A1* 11/2016 Brophy ................ H04L 69/18
2018/0195752 A1 7/2018 Sasaki et al.
2018/0313557 A1* 11/2018 Turney .................. F24F 11/58

FOREIGN PATENT DOCUMENTS

| JP | 2016-061487 A | 4/2016 | |
|---|---|---|---|
| JP | 2017-067427 A | 4/2017 | |
| WO | 2014/171314 A1 | 10/2014 | |
| WO | 2015/151363 A1 | 10/2015 | |
| WO | WO-2015151363 A1 * | 10/2015 | .......... F24F 11/0015 |

OTHER PUBLICATIONS

Extended European Search Report dated Sep. 15, 2021 issued in corresponding European patent application No. 18936195.9.
International Search Report of the International Searching Authority dated Jan. 8, 2019 for the corresponding international application No. PCT/JP2018/036850 (and English translation).
Office Action dated Apr. 19, 2022 issued in corresponding JP Patent Application No. 2020-550980 (and English translation).

* cited by examiner

INFORMATION PROCESSING APPARATUS AND AIR-CONDITIONING SYSTEM PROVIDED WITH THE SAME

CROSS REFERENCE TO RELATED APPLICATION

This application is a U.S. national stage application of International Application No. PCT/JP2018/036850, filed on Oct. 2, 2018, the contents of which are incorporated herein by reference.

TECHNICAL FIELD

The present disclosure relates to an information processing apparatus that provides information on operations to an air-conditioning apparatus, and an air-conditioning system provided with the same.

BACKGROUND

There has been proposed an optimum start-up control device that controls an air-conditioning apparatus including an indoor unit and an outdoor unit such that a target temperature is reached at a target time by performing a precooling operation or a preheating operation for saving energy (see, for example, Patent Literature 1).

PATENT LITERATURE

Patent Literature 1: Japanese Unexamined Patent Application Publication No. 2016-061487

Patent Literature 1 discloses that the optimum start-up control device controls an air-conditioning apparatus in which a single indoor unit is connected to an outdoor unit such that a target temperature is reached at a target time. However, Patent Literature 1 does not state controlling a plurality of indoor units. If the optimum start-up control device of Patent Literature 1 controls an air-conditioning apparatus without considering the heat load due to the air-conditioning environment of each indoor unit, electric power is wasted, which may result in increasing the maximum value of power consumption.

SUMMARY

The present disclosure has been made to solve the above-mentioned problem, and provides an information processing apparatus that reduces the maximum value of power consumption of an air-conditioning apparatus including a plurality of load-side units, and an air-conditioning system provided with the same.

An information processing apparatus according to one embodiment of the present disclosure communicates with an air-conditioning management apparatus configured to control an operating status of an air-conditioning apparatus including a plurality of load-side units, the information processing apparatus including: a schedule determination unit configured to determine a schedule of the operating status for causing a temperature of an air-conditioned space of each of the load-side units to reach a specified set temperature at a specified set time, based on a learning model representing an input-output relationship between input data indicating an influencing factor of a thermal load of each of the load-side units and output data indicating the thermal load.

An air-conditioning system according to another embodiment of the present disclosure includes: the information processing apparatus described above; the air-conditioning apparatus including the plurality of load-side units and a heat-source-side unit; space temperature sensors each configured to detect the temperature of the air-conditioned space of a corresponding one of the load-side units; and the air-conditioning management apparatus connected to the plurality of space temperature sensors.

According to the above embodiments of the present disclosure, for each of the plurality of load-side units, the thermal load of each load-side unit is estimated by using a learning model, so that the air-conditioning apparatus can perform operations suitable for the air-conditioning environment of the air-conditioned space of each load-side unit. As a result, in the case where the time of increase in the operating load of each load-side unit is shifted, it is possible to reduce the maximum value of the entire power consumption.

DETAILED DESCRIPTION

Embodiment 1

Figure 1:
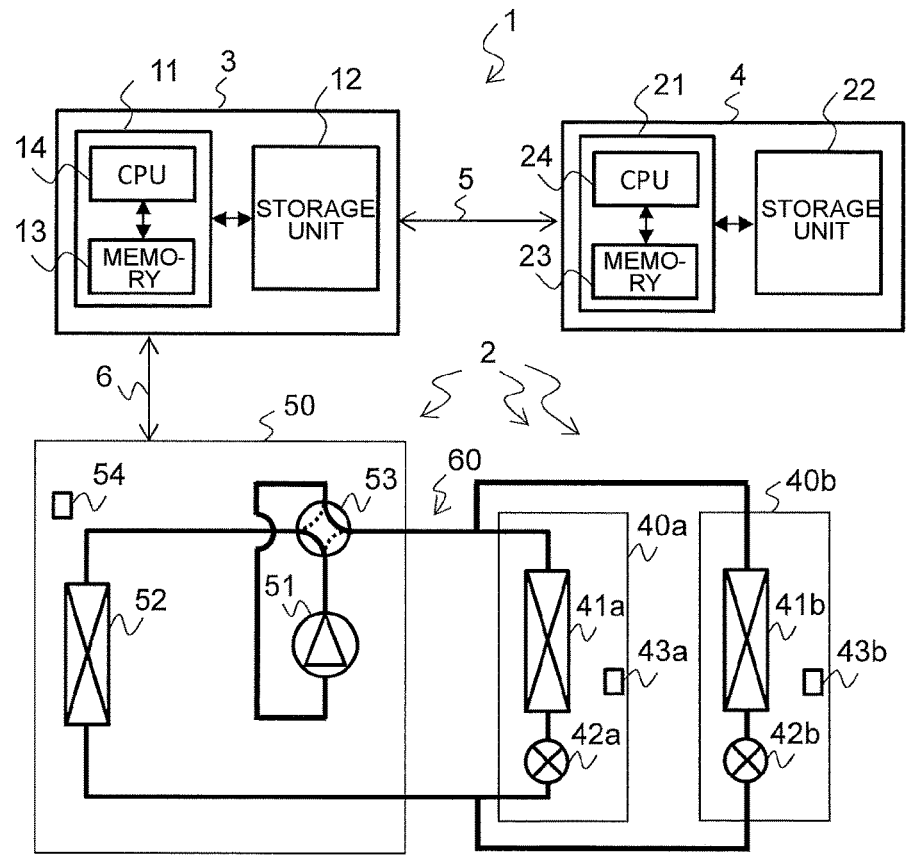
FIG. 1 is a diagram illustrating an exemplary configuration of an air-conditioning system according to Embodiment 1 of the present disclosure.

The configuration of an air-conditioning system according to Embodiment 1 will be described. FIG. 1 is a diagram illustrating an exemplary configuration of an air-conditioning system according to Embodiment 1 of the present disclosure. As illustrated in FIG. 1, an air-conditioning system 1 includes an air-conditioning apparatus 2, an air-conditioning management apparatus 3 that controls the air-conditioning apparatus 2, and an information processing apparatus 4 that notifies the air-conditioning management apparatus 3 of a schedule of the operating status of the air-conditioning apparatus 2. The air-conditioning management apparatus 3 is connected to a plurality of sensors provided in the air-conditioning apparatus 2, and a plurality of devices controlled by the air-conditioning apparatus 2, via a communication line 6. The air-conditioning management apparatus 3 is connected to the information processing apparatus 4 via a communication line 5. The communication line 5 connecting the air-conditioning management apparatus 3 and the information processing apparatus 4 may be a network. The network is, for example, the Internet.

The air-conditioning apparatus 2 includes a heat-source-side unit 50, and a plurality of load-side units 40a and 40b. The heat-source-side unit 50 includes a compressor 51 that compresses and discharges refrigerant, a heat-source-side heat exchanger 52 that causes heat exchange to be performed between the outside air and the refrigerant, and a four-way valve 53 that changes the flow direction of the refrigerant in accordance with the operating mode. The load-side unit 40a includes a load-side heat exchanger 41a that causes heat exchange to be performed between the air in the room as an air-conditioned space of the load-side unit 40a and the refrigerant, and an expansion device 42a that expands the refrigerant by reducing the pressure of the high-pressure refrigerant. The load-side unit 40b includes a load-side heat exchanger 41b that causes heat exchange to be performed between the air in the room as an air-conditioned space of the load-side unit 40b and the refrigerant, and an expansion device 42b that expands the refrigerant by reducing the pressure of the high-pressure refrigerant. The load-side unit 40a is provided with a space temperature sensor 43a that detects a room temperature Tra. The load-side unit 40b is provided with a space temperature sensor 43b that detects a room temperature Trb. The heat-source-side unit 50 is provided with an outside air temperature sensor 54 that detects an outside air temperature Tout. In the following description, the room temperatures Tra and Trb are referred to collectively as a room temperature Tr.

The compressor 51 is, for example, an inverter compressor capable of changing the capacity by changing the operating frequency. The expansion devices 42a and 42b are, for example, electronic expansion valves. The heat-source-side heat exchanger 52 and the load-side heat exchangers 41a and 41b are, for example, fin-and-tube type heat exchangers. In the heat-source-side unit 50 and the load-side unit 40a, the compressor 51, the heat-source-side heat exchanger 52, the expansion device 42a, and the load-side heat exchanger 41a are connected to form a refrigerant circuit 60 in which the refrigerant circulates. Similarly, in the heat-source-side unit 50 and the load-side unit 40b, the compressor 51, the heat-source-side heat exchanger 52, the expansion device 42b, and the load-side heat exchanger 41b are connected to form the refrigerant circuit 60 in which the refrigerant circulates.

The air-conditioning management apparatus 3 includes a control unit 11 and a storage unit 12. The storage unit 12 is, for example, a non-volatile memory such as a flash memory. The control unit 11 includes a memory 13 that stores a program, and a CPU (central processing unit) 14 that executes processing according to the program. The information processing apparatus 4 includes a control unit 21 and a storage unit 22. The information processing apparatus 4 is, for example, a server. The storage unit 12 is, for example, an HDD (hard disk drive). The control unit 21 includes a memory 23 that stores a program, and a CPU 24 that executes processing according to the program.

Figure 2:
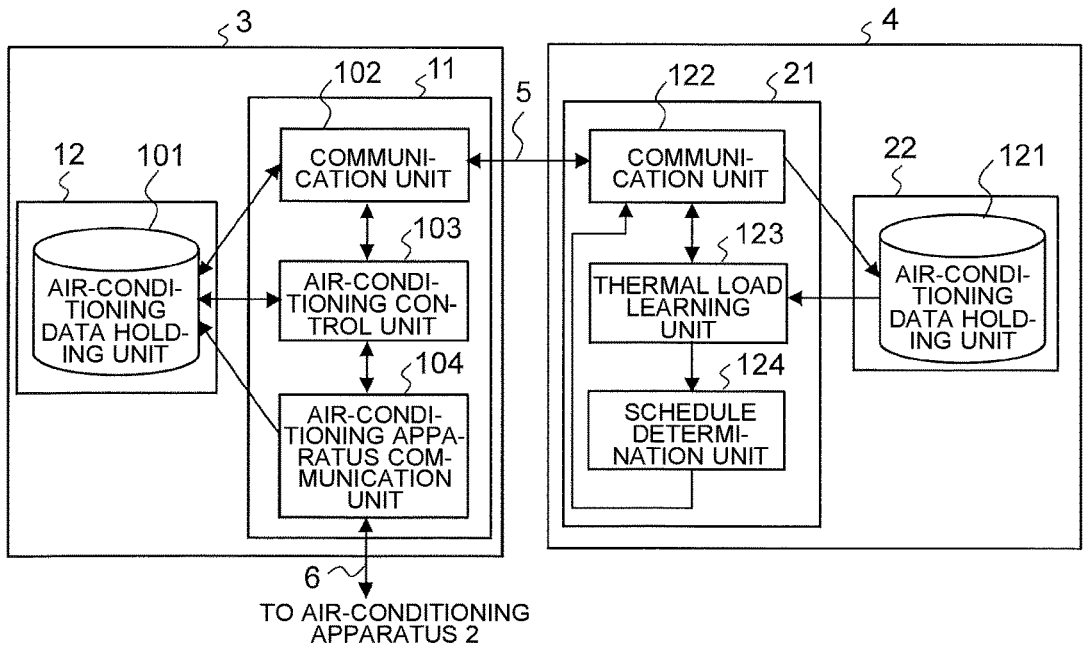
FIG. 2 is a block diagram illustrating an exemplary configuration of an air-conditioning management apparatus and an information processing apparatus of FIG. 1.
Figure 3:
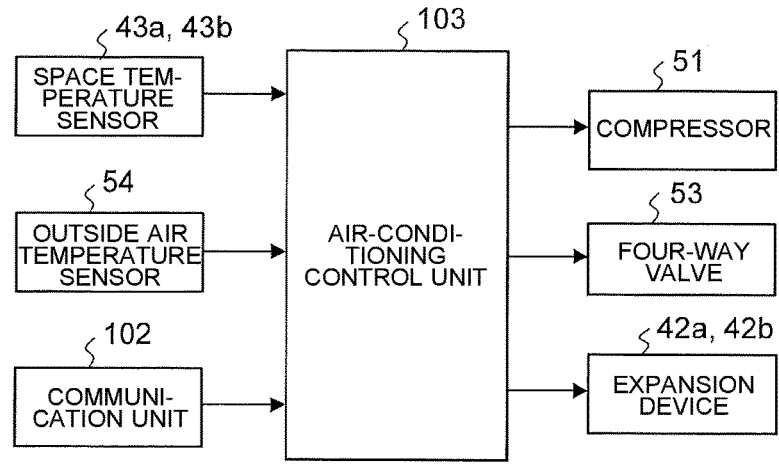
FIG. 3 is a diagram for explaining control performed on an air-conditioning apparatus by an air-conditioning control unit of FIG. 2.

FIG. 2 is a block diagram illustrating an exemplary configuration of the air-conditioning management apparatus and the information processing apparatus of FIG. 1. FIG. 3 is a diagram for explaining control performed on the air-conditioning apparatus by an air-conditioning control unit of FIG. 2. The configuration of the air-conditioning management apparatus 3 will be described with reference to FIGS. 1 to 3. The storage unit 12 of the air-conditioning management apparatus 3 includes an air-conditioning data holding unit 101. The control unit 11 includes a communication unit 102, an air-conditioning control unit 103, and an air-conditioning apparatus communication unit 104. The CPU 14 of FIG. 1 executes a program, so that the communication unit 102, the air-conditioning control unit 103, and the air-conditioning apparatus communication unit 104 are implemented.

The air-conditioning data holding unit 101 stores air-conditioning data. The air-conditioning data includes, for example, the operating frequency of the compressor 51, the opening degrees of the expansion devices 42a and 42b, and the values detected by various sensors. The communication unit 102 exchanges data with the information processing apparatus 4 through the communication line 5, and manages the communication with the information processing apparatus 4. Specifically, the communication unit 102 reads the air-conditioning data from the air-conditioning data holding unit 101, and transmits the air-conditioning data to the information processing apparatus 4. Further, upon receiving from the information processing apparatus 4 a schedule of the operating status including the start time of the compressor 51 and the operating frequency that is set for the compressor 51 at the time of start-up, the communication unit 102 passes the schedule to the air-conditioning control unit 103. The operating status may include information on the opening degrees of the expansion devices 42a and 42b. The schedule may include time-series set values of the operating status including the operating frequency of the compressor 51 and the opening degrees of the expansion devices 42a and 42b.

The air-conditioning apparatus communication unit 104 relays communication between the air-conditioning apparatus 2 and each of the air-conditioning control unit 103 and the storage unit 12, and manages communication with the air-conditioning apparatus 2. The air-conditioning apparatus communication unit 104 acquires data from the compressor 51, the four-way valve 53, the expansion devices 42a and 42b, the outside air temperature sensor 54, and the space temperature sensors 43a and 43b, through the communication line 6, and stores the acquired data in the air-conditioning data holding unit 101. The data obtained from the compressor 51, the four-way valve 53, and the expansion devices 42a and 42b indicate the operating status. The data acquired from the outside air temperature sensor 54 and the space temperature sensors 43a and 43b indicate the values detected by the sensors.

When the load-side unit 40a operates, the air-conditioning control unit 103 controls the operating frequency of the compressor 51 and the opening degree of the expansion device 42a such that the room temperature Tra detected by the space temperature sensor 43a becomes a set temperature Tsa. When the load-side unit 40b operates, the air-conditioning control unit 103 controls the operating frequency of the compressor 51 and the opening degree of the expansion device 42b such that the room temperature Tb detected by the space temperature sensor 43b becomes a set temperature Tsb. When the load-side units 40a and 40b operate, the air-conditioning control unit 103 controls the operating frequency of the compressor 51 and the opening degrees of the expansion devices 42a and 42b such that the room temperature Tra becomes the set temperature Tsa and the room temperature Trb becomes the set temperature Tsb. In the following description, the set temperatures Tsa and Tsb are referred to collectively as a set temperature Tset.

The set temperature Tsa is stored in the memory 13 when entered by the user who uses a room as the air-conditioned space of the load-side unit 40a, by operating a non-illustrated remote controller, for example. The set temperature Tsb is stored in the memory 13 when entered by the user who uses a room as the air-conditioned space of the load-side unit 40b, by operating a non-illustrated remote controller. Further, the air-conditioning control unit 103 may take into account the influence of the outside air temperature Tout when determining the operating frequency of the compressor 51.

Upon receiving a schedule of the operating status from the information processing apparatus 4 via the communication unit 102, the air-conditioning control unit 103 controls the air-conditioning apparatus 2 according to the schedule. For example, if the schedule includes the start time and the operating frequency of the compressor 51, the air-conditioning control unit 103 sets the operating frequency for the compressor 51, and starts the compressor 51 at the start time. If the schedule includes time-series set values of the opening degrees of the expansion devices 42a and 42b, the air-conditioning control unit 103 controls the opening degrees of the expansion devices 42a and 42b according to the schedule.

The configuration of the information processing apparatus 4 will now be described with reference to FIGS. 1 and 2. The storage unit 22 of the information processing apparatus 4 includes a learning data holding unit 121. The control unit 21 includes a communication unit 122, a thermal load learning unit 123, and a schedule determination unit 124. The CPU 24 of FIG. 1 executes a program, so that the communication unit 122, the thermal load learning unit 123, and the schedule determination unit 124 are implemented.

The learning data holding unit 121 stores learning data used for machine learning, among data included in the air-conditioning data stored in the air-conditioning data holding unit 101 of the air-conditioning management apparatus 3. The learning data includes a set of input data and output data. In the case of the load-side unit 40a, the input data includes the outside air temperature Tout, the value detected by the space temperature sensor 43a, the set temperature Tsa, and the operating frequency of the compressor 51. The output data includes the thermal load that is processed by the load-side unit 40a. The thermal load is proportional to the temperature difference between the room temperature Tr and the set temperature Tset. Further, the thermal load is influenced by the outside air temperature Tout and the indoor generated heat amount. The indoor generated heat amount differs between the air-conditioned spaces of the load-side units 40a and 40b. Therefore, the learning data needs to be stored for each of the load-side units 40a and 40b.

The communication unit 122 exchanges data with the air-conditioning management apparatus 3, and manages the communication with the air-conditioning management apparatus 3. Specifically, the communication unit 122 acquires learning data from the air-conditioning data stored in the air-conditioning data holding unit 101 via the communication unit 102, and stores the acquired learning data in the learning data holding unit 121. The thermal load learning unit 123 performs machine learning according to a machine learning program using the learning data stored in the machine learning data holding unit 121, and estimates the thermal loads of the load-side units 40a and 40b from the total thermal load. Then, the thermal load learning unit 123 obtains a learning model representing the input-output relationship between input data and output data, for each of the load-side units 40a and 40b. The thermal load learning unit 123 stores the obtained learning model in the memory 23. The learning model may be stored in the storage unit 22, in place of the memory 23.

The schedule determination unit 124 determines the schedule of the operating status for causing the room temperature to reach a specified set temperature at a specified set time for each load-side unit, based on the learning model obtained by the thermal load learning unit 123 for each of the load-side units 40a and 40b. The schedule indicates, for example, that the operating frequency of the compressor 51 is set to F1 [Hz] at 6 a.m., and the operating frequency of the compressor 51 is set to F2 [Hz] increased by $\Delta f$ from the F1 at 8 a.m.

Figure 4:
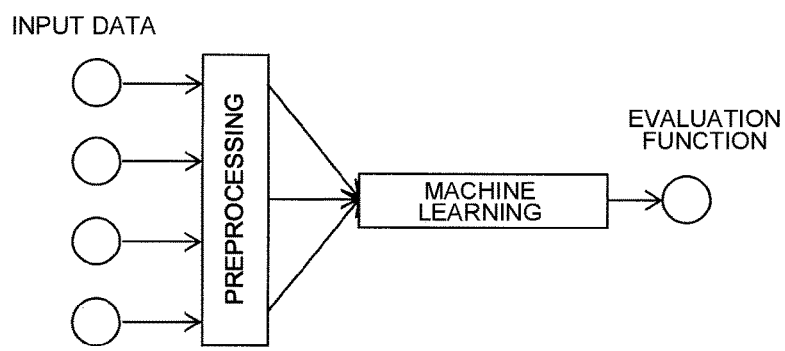
FIG. 4 is a diagram schematically illustrating an example of the operation procedure of a thermal load learning unit and a schedule determination unit of FIG. 2.

The operations of the thermal load learning unit 123 and the schedule determination unit 124 of FIG. 2 will now be described with reference to FIG. 4. FIG. 4 is a diagram schematically illustrating an example of the operation procedure of the thermal load learning unit and the schedule determination unit of FIG. 2.

The input data of the learning data includes, for example, the outside air temperature Tout, the room temperature Tr, the set temperature Tset, and the operating status. In the following description, the operating status indicates the operating frequency of the compressor 51. However, the operating status may indicate the opening degrees of the expansion devices 42a and 42b. Information on weather forecast may be used as the outside air temperature Tout. The use of information on weather forecast will be described below. In FIG. 4, the input data includes four items: the outside air temperature Tout, the room temperature Tr, the set temperature Tset, and the operating status.

As illustrated in FIG. 4, the thermal load learning unit 123 may perform, as preprocessing of machine learning, either or both of optimization of input data and reduction in input dimension. Reduction in input dimension is, for example, calculating the difference between the room temperature Tr and the set temperature Tset. Optimization of input data is, for example, normalizing the set temperatures Tsa and Tsb if the set temperature Tset differs between the air-conditioned spaces of the load-side units 40a and 40b.

In the machine learning illustrated in FIG. 4, the thermal load learning unit 123 performs, for example, supervised learning. Supervised learning is machine learning that obtains a learning model representing an input-output relationship for accurately estimating an unknown situation from a plurality of learning data. The machine learning performed by the thermal load learning unit 123 is not limited to supervised learning, and may be reinforcement learning. Further, deep learning may be applied to supervised learning and reinforcement learning. Moreover, the thermal load learning unit 123 may select one type of machine learning from supervised learning, reinforcement learning, and neural networks, in accordance with the required accuracy and calculation efficiency for the input-output relationship.

An exemplary method of obtaining a learning model will now be described. The factors influencing the thermal load of the thermal characteristic model include the outside air temperature Tout, the room temperature Tr, an indoor generated heat amount Qr, an air-conditioning heat amount $Q_{HVAC}$ [kW], the amount of solar radiation, and the adjacent room temperature. One of the thermal characteristic models using typical influencing factors among these influencing factors is represented by the following Equation (1).

[Math. 1]

$$C\frac{dTr}{dt} = aQ_{HVAC} + bQr + \frac{(Tout - Tr)}{Rwin} + \alpha \quad (1)$$

In Equation (1), a and b represent coefficients, and C represents an indoor heat capacity [kJ/K]. Rwin represents a window thermal resistance [kW/K], and α represents the amount of heat due to other influencing factors of the thermal load. The air-conditioning heat amount $Q_{HVAC}$ is the amount of heat removed in the case of a cooling operation, and the amount of heat supplied in the case of a heating operation. The air-conditioning heat amount $Q_{HVAC}$ is calculated by the thermal load learning unit 123 from a theoretical value based on the operating status including the operating frequency of the compressor 51.

When, in Equation (1), the term on the left-hand side is moved to the right-hand side, and the air-conditioning heat amount $Q_{HVAC}$ is moved to the left-hand side, the following Equation (2) is obtained. Note that, in Equation (2), the coefficient a of the air-conditioning heat amount $Q_{HVAC}$ includes a positive or negative sign.

[Math. 2]

$$aQ_{HVAC} = bQr + \frac{(Tout - Tr)}{Rwin} - C\frac{dTr}{dt} + \alpha \quad (2)$$

Referring to the amount of heat indicated on the right-hand side of Equation (2), the integrated value over time until when the room temperature Tr reaches the set temperature Tset can be considered as a thermal load. The thermal load learning unit 123 assigns input data that changes over time to Equation (2), and stores learning data including sets of input data and output data, for each of the load-side units 40a and 40b. Then, the thermal load learning unit 123 obtains a learning model representing the input-output relationship between input data and output data, based on the accumulated learning data.

Note that the thermal characteristic model used to collect learning data is not limited to Equation (1). A plurality of thermal characteristic models may be used to collect learning data. Further, the thermal load learning unit 123 may store learning data for each of the plurality of thermal characteristic models, extract a parameter acting as an influencing factor that greatly influences the thermal load in the air-conditioning environment in the air-conditioned space, and select the optimum thermal characteristic model out of the plurality of thermal characteristic models.

The schedule determination unit 124 determines the schedule of the operating status of the air-conditioning apparatus 2, based on the learning model for the thermal load of each load-side unit obtained by the thermal load learning unit 123. In this step, the schedule determination unit 124 may adjust the schedule according to the evaluation function specified by the user. The evaluation function can be changed according to the item on which the user places importance, by the user operating a non-illustrated remote controller, for example. Examples of evaluation function include those for evaluating the comfort for the user, the amount of power consumption of the air-conditioning apparatus 2, and the electricity charges of the air-conditioning apparatus 2.

The operating status of the output schedule varies according to the evaluation function specified by the user. In the case where the evaluation function is for the comfort for the user, the schedule determination unit 124 calculates a schedule for each of the load-side units 40a and 40b such that the specified set temperature is reached at the specified set time. In this step, the schedule determination unit 124 determines the start time and the operating frequency of the compressor 51 while prioritizing the room temperature reaching the specified set temperature at the specified set time over the power consumption of the compressor 51.

Figure 5:
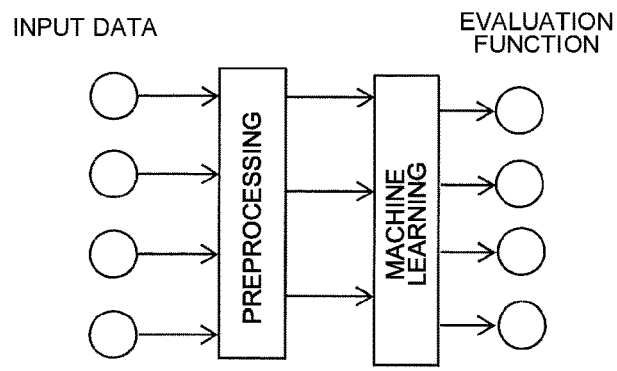
FIG. 5 is a diagram schematically illustrating another example of the operation procedure of the thermal load learning unit and the schedule determination unit of FIG. 2.

FIG. 5 is a diagram schematically illustrating another example of the operation procedure of the thermal load learning unit and the schedule determination unit of FIG. 2. In FIG. 5, four load-side units are provided. In FIG. 5, the evaluation function is for the power consumption. The schedule determination unit 124 determines the start time and the operating frequency of the compressor 51 such that the room temperature reaches the specified set temperature at the set time specified by each of the users of the four load-side units, and such that the power consumption of the compressor 51 is minimized. The schedule determination unit 124 outputs the start time and the operating frequency of the compressor 51 for each of the four load-side units at one time.

Further, in FIG. 5, the evaluation function may be for the electricity charges. In the case where the evaluation function is for the electricity charges, information on electricity prices at different times of the day is stored in the memory 23. For example, if the electricity price during the hours from 9 p.m. to 5 a.m. is cheaper than the electricity prices during the other hours, the schedule determination unit 124 may specify 9 p.m. to 5 a.m. for the start time of the compressor 51. Further, in FIG. 5, four air-conditioning apparatuses 2 may be provided in place of four load-side units. In this case, the schedule determination unit 124 may output start times of the compressors 51 of all the air-conditioning apparatuses 2 at one time. As described with reference to FIGS. 4 and 5, the start time of the compressor 51 varies depending on the evaluation function.

Figure 6:
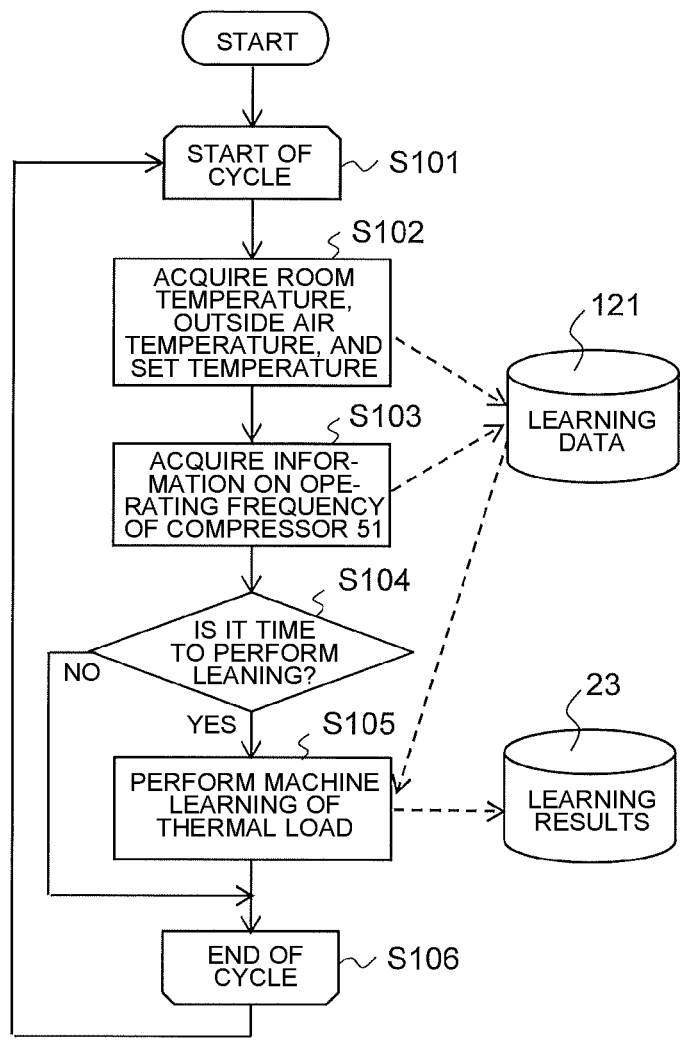
FIG. 6 is a flowchart illustrating the procedure of machine learning performed by the thermal load learning unit of FIG. 4.

FIG. 6 is a flowchart illustrating the procedure of machine learning performed by the thermal load learning unit of FIG. 4. When the start time of a predetermined cycle comes (step S101), the communication unit 122 reads data including the room temperatures Tra and Trb, the outside air temperatures Tout, and the set temperature Tsa and Tsb, from the air-conditioning data stored in the air-conditioning management apparatus 3 (step S102). Then, the communication unit 122 stores the read data in the learning data holding unit 121. Further, the communication unit 122 acquires data indicating the operating status of the air-conditioning apparatus 2 from the air-conditioning data stored in the air-conditioning management apparatus 3 (step S103), and stores the acquired data in the learning data holding unit 121. In FIG. 6, the operating status indicates the operating frequency of the compressor 51.

The thermal load learning unit 123 determines whether it is time to perform learning (step S104). If it is not time to perform learning, the process proceeds to step S106. If it is time to perform learning in step S104, the thermal load learning unit 123 performs machine learning described with reference to FIG. 4 (step S105), and stores a learning model as the learning results in the memory 23. In the case where the memory 23 has already stored a learning model, the thermal load learning unit 123 updates the learning model stored in the memory 23. The cycle in which machine learning is performed can be freely set by the user. The storage that stores the learning model is not limited to the memory 23. The storage unit 22 may store the learning model.

Figure 7:
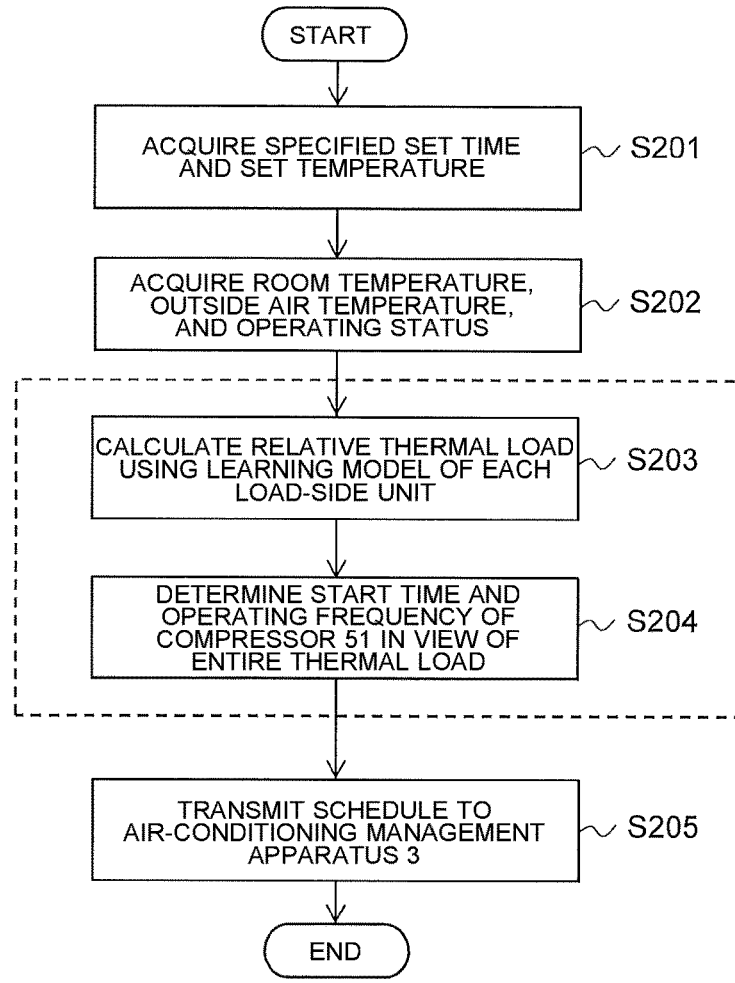
FIG. 7 is a flowchart illustrating the operation procedure of the information processing apparatus of FIG. 1.

The operation of the information processing apparatus 4 of Embodiment 1 will now be described. FIG. 7 is a flowchart illustrating the operation procedure of the information processing apparatus of FIG. 1. It is assumed here that each of the users of the load-side units 40a and 40b specifies the set time and the set temperature such that the room temperature Tr reaches the set temperature at the set time, by operating a non-illustrated remote controller. The communication unit 102 of the air-conditioning management apparatus 3 stores the set time and the set temperature of each load-side unit in the storage unit 12. As for the load-side unit 40a, the specified set time is ta, and the specified set temperature is Tsa1. As for the load-side unit 40b, the specified set time is tb, and the specified set temperature is Tsb1. The steps enclosed by dashed lines in FIG. 7 are performed based on the learning model obtained by the thermal load learning unit 123.

The communication unit 122 acquires the set time and the set temperature specified for each load-side unit from the air-conditioning management apparatus 3 (step S201). The communication unit 122 acquires air-conditioning data including the room temperature Tr, the outside air temperature Tout, and the operating status at the current time from the air-conditioning management apparatus 3, at the time earlier by a predetermined time than the earliest set time among the specified set times (step S202). The predetermined time is one hour, for example. It is assumed here that set time ta is earlier than set time tb.

The schedule determination unit 124 receives the set times ta and tb, the set temperatures Tsa1 and Tsb1, and the air-conditioning data, from the communication unit 122. The schedule determination unit 124 calculates the required relative thermal load, by using each of the learning models of the load-side units 40a and 40b, while using information received from the communication unit 122 as input data (step S203). The schedule determination unit 124 determines the start time and the operating frequency of the compressor 51, in view of the entire thermal load (step S204). Then, the schedule determination unit 124 determines a schedule of the operating status for causing the room temperature Tra to reach the set temperature Tsa1 at the set time ta, and the room temperature Trb to reach the set temperature Tsb1 at the set time tb. The schedule determination unit 124 transmits the determined schedule to the air-conditioning management apparatus 3 (step S205).

In the procedure illustrated in FIG. 7, the control unit 21 may periodically repeat the operations of steps S202 to S205 until the time reaches the set time ta or tb, and update the schedule to be notified to the air-conditioning management apparatus 3. Further, in the procedure illustrated in FIG. 7, the schedule determination unit 124 transmits the schedule to the air-conditioning management apparatus 3 in step S205. However, an instruction of the operating status may be provided to the air-conditioning management apparatus 3 according to the schedule. In this case, the air-conditioning management apparatus 3 does not have to hold the schedule. Furthermore, in the case where the schedule is updated as time passes, the air-conditioning management apparatus 3 does not have to receive a new schedule from the information processing apparatus 4 every time the schedule is updated.

Figure 8:
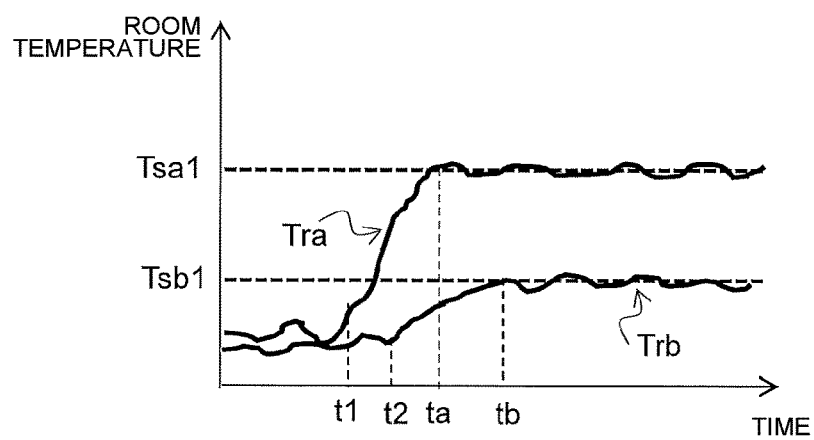
FIG. 8 is a diagram illustrating an example of the case where the air-conditioning management apparatus of FIG. 2 controls a compressor and an expansion device according to a schedule.

FIG. 8 is a diagram illustrating an example of the case where the air-conditioning management apparatus of FIG. 2 controls the compressor and the expansion device according to a schedule. The vertical axis of FIG. 8 represents the room temperature, and the horizontal axis represents the time. FIG. 8 illustrates the case where the load-side units 40a and 40b perform a heating operation.

The schedule indicates, for example, that the operating frequency of the compressor 51 is set to F1 [Hz] and the opening degree of the expansion device 42a is set to Cva at time t1; and the operating frequency of the compressor 51 is set to F2 [Hz] and the opening degree of the expansion device 42b is set to Cvb at time t2. A relationship F2>F1 is satisfied. The compressor 51 starts at time t1 earlier than the set time ta, so that the room temperature Tra reaches the set temperature Tsa1 at the set time ta. Further, the operating frequency of the compressor 51 increases to F2 at time t2 earlier than the set time tb, so that the room temperature Trb reaches the set temperature Tsb1 at the set time tb. In this manner, each of the load-side units 40a and 40b is controlled such that the temperature of each air-conditioned space reaches the set temperature at the set time.

The communication line 5 may be a network. The network is, for example, the Internet. In this case, the information processing apparatus 4 may acquire information on the outside air temperature in the area where the air-conditioning apparatus 2 is installed, via the network from a server that provides weather forecasts. The outside air temperature sensor 54 does not have to be provided. Further, the number of load-side units is not limited to two. There may be three or more load-side units.

The information processing apparatus 4 of Embodiment 1 includes a schedule determination unit 124 configured to determine a schedule of the operating status for causing the temperature of the air-conditioned space of each load-side unit to reach the set temperature at the set time, based on the learning model of each load-side unit. The learning model represents the input-output relationship between input data indicating the influencing factor of the thermal load of each load-side unit and the output data indicating the thermal load.

According to Embodiment 1, the information processing apparatus 4 estimates, for each of the plurality of load-side units 40a and 40b, the thermal load of each load-side unit by using a learning model, thereby obtaining a schedule indicating the operating status suitable for the air-conditioning environment of the air-conditioned space of each load-side unit. As a result, in the case where the time of increase in the operating load of each load-side unit is shifted, it is possible to reduce an increase in the maximum value of the power consumption of the air-conditioning apparatus 2. Therefore, while ensuring comfort for the user by causing the room temperature of each air-conditioned space to reach the set temperature at the set time, the maximum value of the power consumption of the entire air-conditioning apparatus 2 can be reduced. In the case where the electricity charges increase in proportion to the maximum value of the power consumption, it is possible to reduce the electricity charges. Further, since machine learning is used to calculate a learning model of the thermal load, it is easy to change parameters of the input data used for estimating the thermal load.

Further, the information processing apparatus 4 of Embodiment 1 may include the learning data holding unit 121 configured to store learning data including a set of input data and output data of each of the load-side units, and the thermal load learning unit 123. The thermal load learning unit 123 estimates a thermal load that is processed by each of the load-side units, based on the learning data of each of the load-side units, and obtains a learning model representing the input-output relationship between the input data and the output data.

In the case of calculating the thermal load more accurately, it is necessary to use a physical model with the influencing factors including the outside air temperature taken into account and a statistical model. This makes the calculation complex, and increases information processing load. Meanwhile, in Embodiment 1, even in the case where the air-conditioning environments of a plurality of air-conditioned spaces differ from each other, since the thermal load learning unit 123 obtains the thermal load of each air-conditioned space by using learning model through machine learning, the accuracy in calculation of the thermal load is improved while reducing the information processing load.

Further, in Embodiment 1, the user may specify an evaluation function. The schedule determination unit 124 adjusts the schedule in accordance with the specified evaluation function. For example, in the case where the evaluation function is for the power consumption, the schedule determination unit 124 adjusts the schedule for causing the temperature of each air-conditioned space to reach the set temperature at the set time, such that the power consumption of the air-conditioning apparatus 2 is minimized. In the case where the evaluation function is for the electricity charges, the schedule determination unit 124 adjusts the schedule for causing the temperature of each air-conditioned space to reach the set temperature at the set time, such that the start time of the compressor 51 is shifted to the hours of low electricity prices. In this case, the schedule determination unit 124 changes the operating frequency of the compressor 51 to an operating frequency lower than that of the schedule before the adjustment.

[Modification 1]

Figure 9:
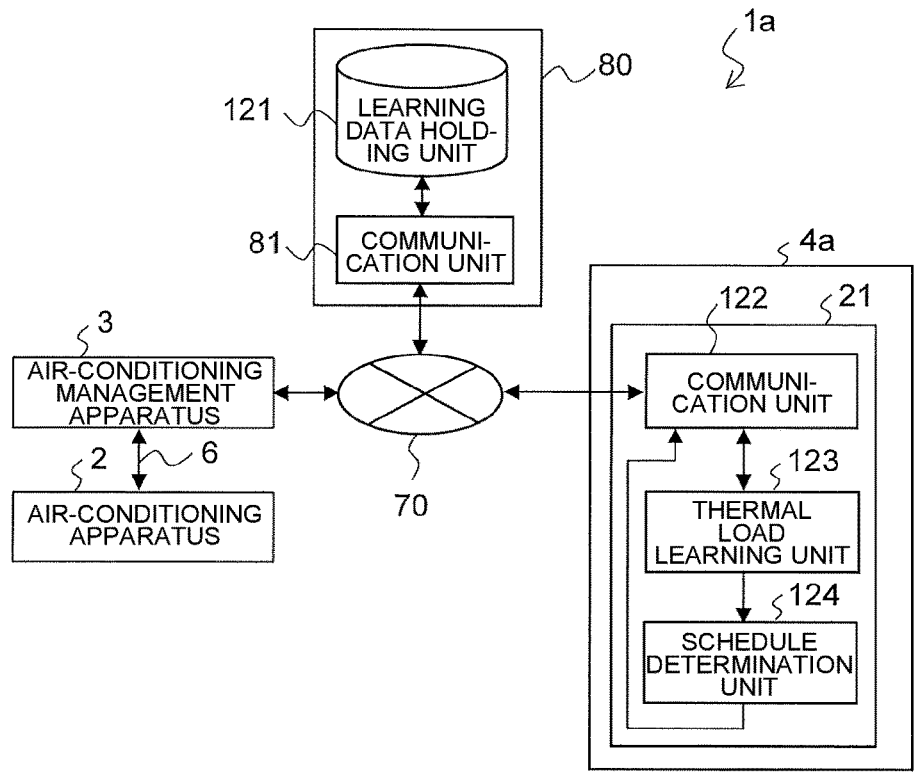
FIG. 9 is a diagram illustrating an exemplary configuration of an air-conditioning system according to Modification 1.

In the air-conditioning system of Embodiment 1, the learning data holding unit 121 does not have to be provided in the information processing apparatus 4. For example, the learning data holding unit 121 may be provided in a storage apparatus connected to a network. The storage apparatus is, for example, a server. FIG. 9 is a diagram illustrating an exemplary configuration of an air-conditioning system according to Modification 1. In the configuration illustrated in FIG. 9, the communication line 5 is a network 70. The network 70 is, for example, the Internet.

In an air-conditioning system 1a of FIG. 9, the air-conditioning management apparatus 3 and an information processing apparatus 4a are connected via the network 70. A storage apparatus 80 is connected to the network 70. The storage apparatus 80 includes a learning data holding unit 121, and a communication unit 81 that exchanges information with other apparatuses via the network 70. The air-conditioning management apparatus 3 and the communication unit 122 can access the learning data holding unit 121 via the network 70 and the communication unit 81. In the case of the configuration illustrated in FIG. 9, since a holding unit that storing air-conditioning data that increases in size in proportion to the number of load-side units is provided separately from the information processing apparatus 4a, the product cost of the information processing apparatus 4a can be reduced. For example, a company that provides a cloud service may maintain and manage the storage apparatus 80.

[Modification 2]

Figure 10:
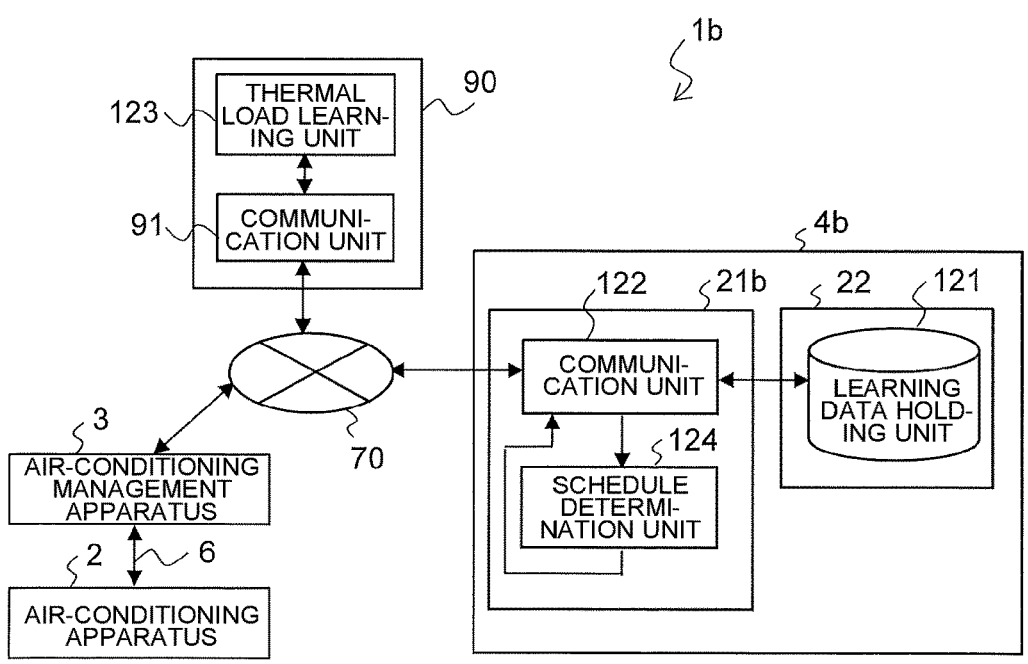
FIG. 10 is a diagram illustrating an exemplary configuration of an air-conditioning system according to Modification 2.

In the air-conditioning system of Embodiment 1, the thermal load learning unit 123 does not have to be provided in the information processing apparatus 4. For example, the thermal load learning unit 123 may be provided in a server connected to a network. FIG. 10 is a diagram illustrating an exemplary configuration of an air-conditioning system according to Modification 2. In the configuration illustrated in FIG. 10, the communication line 5 is the network 70.

In an air-conditioning system 1b of FIG. 10, the air-conditioning management apparatus 3 and an information processing apparatus 4b are connected via the network 70. A server 90 is connected to the network 70. The server 90 includes a thermal load learning unit 123, and a communication unit 91 that exchanges information with other apparatuses via the network 70. The communication unit 122 can access the thermal load learning unit 123 via the network 70 and the communication unit 91. The processing load of machine learning increases in proportion to the number of load-side units. Therefore, in the case of the configuration illustrated in FIG. 10, since the thermal load learning unit 123 is provided separately from the information processing apparatus 4b, the processing load and the product cost of the information processing apparatus 4b can be reduced.

[Modification 3]

Figure 11:
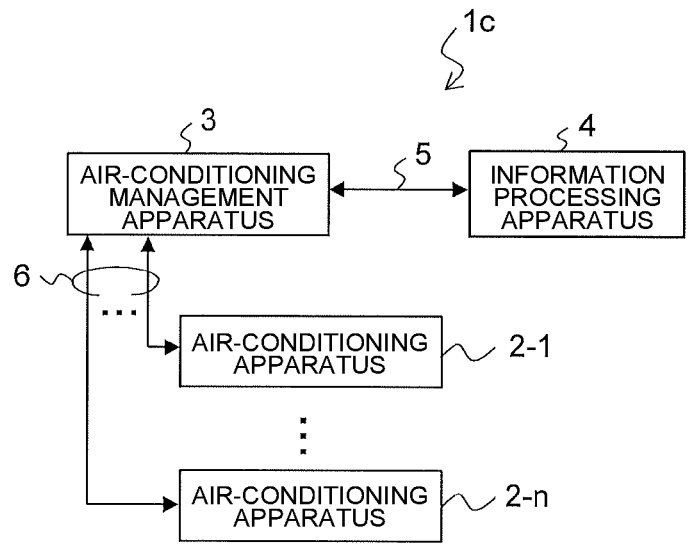
FIG. 11 is a diagram illustrating an exemplary configuration of an air-conditioning system according to Modification 3.

The air-conditioning system of Embodiment 1 may include a plurality of the air-conditioning apparatus 2. FIG. 11 is a diagram illustrating an exemplary configuration of an air-conditioning system according to Modification 3. In an air-conditioning system 1c of FIG. 11, the air-conditioning management apparatus 3 is connected to a plurality of air-conditioning apparatuses 2-1 to 2-n. Here, n is an integer greater than or equal to 2. In this case, the model described with reference to FIG. 3 may be applied. Thus, it is possible to calculate the start time of each compressor 51 in view of the entire system including the plurality of air-conditioning apparatuses 2-1 to 2-n. The schedule determination unit 124 shifts the start times of the compressors 51 of the plurality of air-conditioning apparatuses 2-1 to 2-n, thereby determining a schedule that minimizes the power consumption of the air-conditioning apparatuses 2-1 to 2-n. In this case, the maximum value of the sum of the power consumption of the air-conditioning apparatuses 2-1 to 2-n can be reduced.

[Modification 4]

Figure 12:
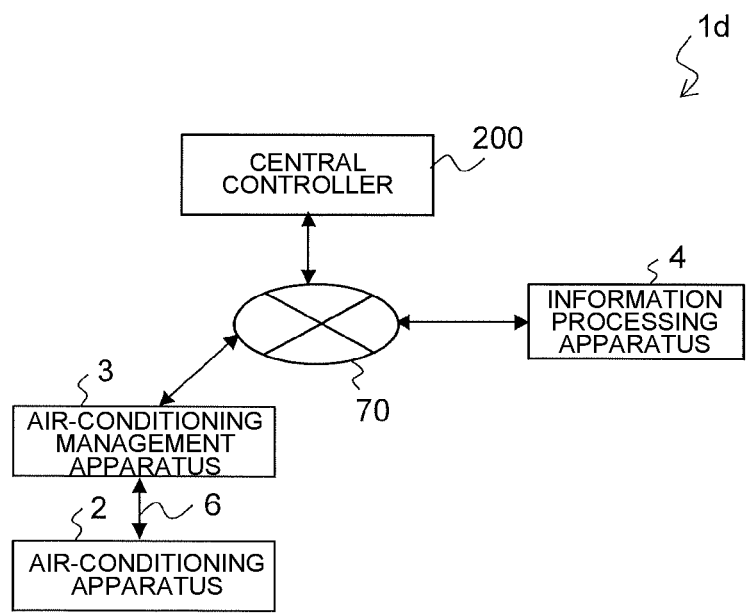
FIG. 12 is a diagram illustrating an exemplary configuration of an air-conditioning system according to Modification 4.

In the air-conditioning system of Embodiment 1, the information processing apparatus 4 may be connected to a controller that monitors the power consumption of the entire building where the plurality of air-conditioning apparatuses 2-1 to 2-n are installed. FIG. 12 is a diagram illustrating an exemplary configuration of an air-conditioning system according to Modification 4. In the configuration illustrated in FIG. 12, the communication line 5 is the network 70.

In an air-conditioning system 1d of FIG. 12, the air-conditioning management apparatus 3 and the information processing apparatus 4 are connected via the network 70. A central controller 200 is connected to the network 70. The central controller 200 is, for example, a server. The central controller 200 monitors the power consumption of the entire building where the air-conditioning apparatus 2 is installed. The power consumption of the entire building includes the power consumption of apparatuses such as an elevator, an automatic door, and a lighting system, other than the air-conditioning apparatus 2. The schedule determination unit 124 acquires time-series information on the power consumption of the entire building from the central controller 200, and determines the schedule of the operating status of the air-conditioning apparatus 2 such that the power consumption of the entire building is minimized. In this case, the maximum value of the power consumption of the entire building where the air-conditioning apparatus 2 is installed is reduced, so that the amount of power consumption of the entire building can be reduced. Further, the schedule determination unit 124 may adjust the schedule for causing the temperature of each air-conditioned space to reach the set temperature at the set time, such that the start time of the compressor 51 is shifted to the hours of low electricity prices. In this case, it is possible to reduce the electricity charges of the entire building.

Note that two or more of Modifications 1 to 4 may be combined. For example, Modification 3 may be applied to Modification 4. In this case, the maximum value of the power consumption of the entire building where the plurality of air-conditioning apparatuses 2-1 to 2-n are installed is reduced, so that the effect of reducing the power consumption of the entire building is expected to be increased.

Embodiment 2

An air-conditioning system of Embodiment 2 is configured such that the air-conditioning management apparatus 3 described in Embodiment 1 has the functions of the information processing apparatus 4. In Embodiment 2, the same elements as those described in Embodiment 1 will not be described in detail.

Figure 13:
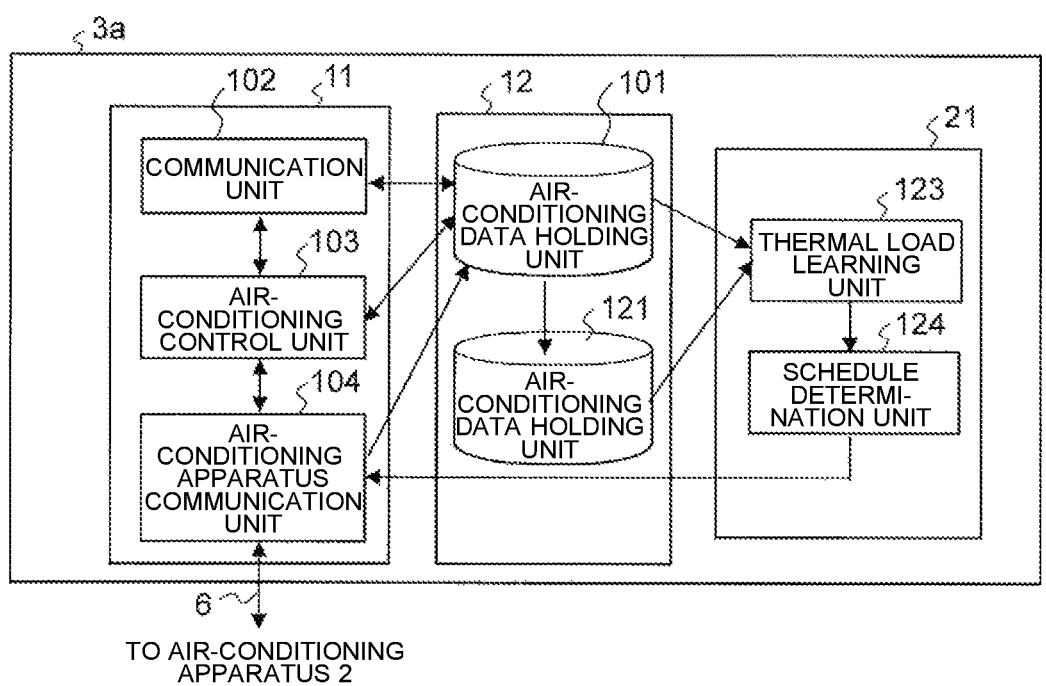
FIG. 13 is a diagram illustrating an exemplary configuration of an air-conditioning system according to Embodiment 2 of the present disclosure.

The configuration of an air-conditioning system according to Embodiment 2 will be described. FIG. 13 is a diagram illustrating an exemplary configuration of an air-conditioning system according to Embodiment 2 of the present disclosure. An air-conditioning management apparatus 3a of FIG. 13 includes the same elements as those of the information processing apparatus 4 of FIG. 2, excluding the communication unit 122. For example, the program executed by the information processing apparatus 4 is executed by the air-conditioning management apparatus 3, so that the thermal load learning unit 123 and the schedule determination unit 124 are implemented on the air-conditioning management apparatus 3. The operation of the air-conditioning system of Embodiment 2 is the same as that of Embodiment 1, and will not be described in detail below.

According to Embodiment 2, since the air-conditioning management apparatus 3 includes the functions of the information processing apparatus 4, a communication interface including the communication unit 122 and the communication line 5 is not required. Consequently, restrictions on installation of apparatuses including the information processing apparatus 4 are reduced, making it easy to install the air-conditioning management apparatus 3a. Modifications 1 to 4 may be applied also to Embodiment 2.

The invention claimed is:

1. An information processing server that communicates with an air-conditioning management apparatus comprising an air-conditioning management memory and an air-conditioning management processor configured to control an operating status of an air-conditioning apparatus including a plurality of load-side units, the information processing server comprising:

a processor that executes processing according to a program; and a memory configured to store the program; wherein the memory is configured to store, for each of the load-side units, learning data including a set of input data and output data, the input data indicating an influencing factor of a thermal load of each of the load-side units and output data indicating the thermal load;

the processor is configured to estimate a thermal load that is processed by each of the load-side units, based on the learning data of each of the load-side units stored in the memory, and obtain a learning model representing the input-output relationship between the input data and the output data, for each of the load-side units; and is configured to determine a schedule of the operating status for causing a temperature of an air-conditioned space of each of the load-side units to reach a specified set temperature at a specified set time, based on the learning model of each of the load-side units, wherein the input data includes an outside air temperature, the temperature of the air-conditioned space, the set temperature of the air-conditioned space, and the operating status of the air-conditioning apparatus, the output data includes the thermal load that is processed by each of the plurality of load-side units, each of the plurality of load-side units comprises an expansion valve, and the operating status includes the opening degree of each of the plurality of expansion valves.

2. The information processing server of claim 1, wherein when an evaluation function is specified, the processor adjusts the schedule of the operating status in accordance with the specified evaluation function.

3. An air-conditioning system comprising:

the information processing server of claim 1;

the air-conditioning apparatus including the plurality of load-side units and a heat-source-side unit;

space temperature sensors each configured to detect the temperature of the air-conditioned space of a corresponding one of the load-side units; and the air-conditioning management apparatus connected to the plurality of space temperature sensors.

4. The air-conditioning system of claim 3, wherein the air-conditioning management apparatus includes the information processing server.

5. The air-conditioning system of claim 3, further comprising:

a storage apparatus connected to a network;

wherein each of the air-conditioning management apparatus and the processor communicates with the storage apparatus via the network; and wherein the storage apparatus stores the learning data of each of the load-side units.

6. The air-conditioning system of claim 3, further comprising:

a thermal load learning server connected to a network;

wherein the processor includes a first processor configured to estimate a thermal load that is processed by each of the load-side units, based on the learning data of each of the load-side units stored in the memory, and obtain the learning model representing the input-output relationship between the input data and the output data, for each of the load-side units; and a second processor configured to determine a schedule of the operating status based on the learning model of the each of the load-side units;

the information processing server includes the second processor; wherein each of the air-conditioning management apparatus, the memory, and the second processor is configured to communicate with the thermal load learning server via the network; and wherein the thermal load learning server includes the first processor.

7. The air-conditioning system of claim 3, wherein the information processing server is connected to the air-conditioning management apparatus via a network.

8. The air-conditioning system of claim 3,
wherein the air-conditioning apparatus is provided in plurality; and
wherein the air-conditioning management apparatus manages the plurality of air-conditioning apparatuses.

9. The air-conditioning system of claim 8, wherein the processor determines the schedule of the operating status such that power consumption of the plurality of air-conditioning apparatuses is minimized.

10. The air-conditioning system of claim 3,
wherein the information processing server is connected to a central server configured to monitor power consumption of an entire building where the air-conditioning apparatus is installed; and
wherein the processor determines the schedule of the operating status of the air-conditioning apparatus such that power consumption of the entire building is minimized.

11. The air-conditioning system of claim 3,
wherein the information processing server is connected to a central server configured to monitor power consumption of an entire building where the air-conditioning apparatus is installed; and
wherein the processor determines the schedule of the operating status of the air-conditioning apparatus such that the electricity charges of the entire building are minimized.

* * * * *